(No Model.)

J. F. MEHREN.
APPARATUS FOR TELEPHONIC TRANSMISSION.

No. 292,835. Patented Feb. 5, 1884.

Witnesses:
John P Barrett
D M Hyland

Inventor:
Jacob F. Mehren

UNITED STATES PATENT OFFICE.

JACOB F. MEHREN, OF CHICAGO, ILLINOIS.

APPARATUS FOR TELEPHONIC TRANSMISSION.

SPECIFICATION forming part of Letters Patent No. 292,835, dated February 5, 1884.

Application filed February 21, 1883. (No model.)

*To all whom it may concern:*

Be it known that I, JACOB F. MEHREN, a citizen of the United States, residing at Chicago, in the county of Cook and State of Illinois, have invented a certain new and useful Improvement in Apparatus for Telephonic Transmission, of which the following is a full and clear description, which will enable others skilled in the science to which it appertains to readily understand and use the same.

My invention relates to an improvement in telephone-transmitters which require local batteries. These local batteries are very objectionable on account of the constant care they require, and especially of the difficulty of keeping them from freezing when used in exposed places, as is the case in a number of instances.

The object of my invention is to make the use of the aforesaid local batteries unnecessary, and to utilize the current ordinarily required in a telegraph-circuit so as to fulfill the duty of a local-battery current for the transmitter. To this end I connect the transmitter with the primary wire of an induction-coil in a novel manner, hereinafter described, for the purpose of utilizing the said main current or currents supplied to a line from some central point.

The accompanying drawing is a diagram of a telephone-circuit, showing the connections in accordance with my improvement.

Figure 1:
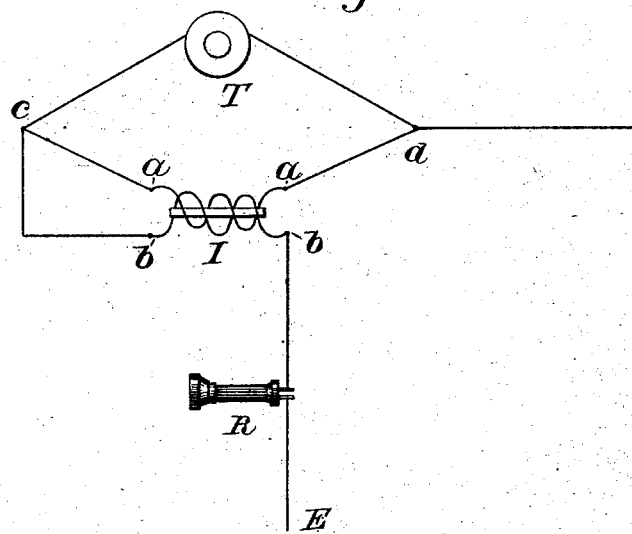
Figure 2:
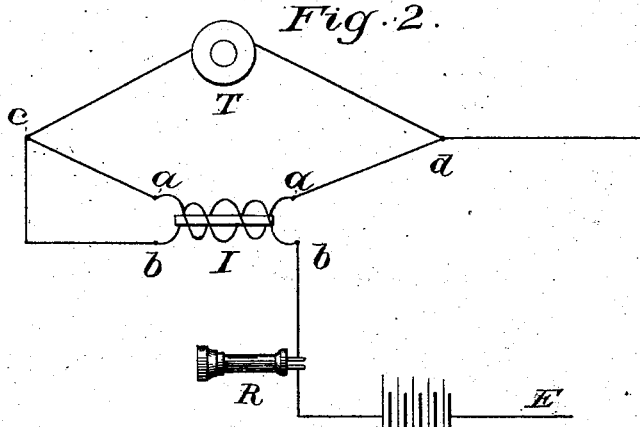

Figure 1 represents one terminal or end of line. Fig. 2 represents the central office or starting-point, where also the battery M is located.

The transmitter T and primary wire *a* of the induction-coil I are connected, so as to make two branches between the points *c* and *d*, forming jointly part of the entire circuit, as is clearly shown. The resistance of the primary wire *a* is preferably equal to the resistance of the transmitter T, when the latter is properly adjusted for speaking. A current from the battery M, Fig. 2, will pass through the receiver R; thence through the secondary wire *b* of the induction-coil I to the point C, where it will divide equally over the two branches formed by the transmitter T and by the primary *a* of the induction-coil I (the resistance of both branches being equal) to the point *d*; thence over the line L to the point *d* at Fig. 1, where it again divides equally over the transmitter T and the primary wire *a* to the point *c*; thence through the secondary wire *b* and receiver R to earth E, and completes the circuit through the earth to battery M at Fig. 2. As described, the strength of the current in each of the branches formed by the transmitters T T and the primary wires *a a* would be equal and continuous. If, now, one of the transmitters be set into vibrations by being spoken to, thereby causing vibratory or undulatory alterations in its resistance, the strength of the currents through the two branches formed by this transmitter and the primary wire will be likewise vibratory or undulatory inversely proportional to the resistances. These vibrations or undulations of the current through the primary wire *a* induce currents in the secondary wire *b*, and these induced currents are conveyed over the entire circuit, including the receivers R R, which will reproduce the vibrations as communicated to the transmitter.

The above-described manner of connecting a transmitter with the primary wire of an induction-coil and using the line-current instead of a local current is especially suited for metallic circuits which have a continuous current over them, for the purpose of receiving or transmitting signals, &c., and which have a number of telephones connected with them, as is the case in many instances.

Having thus fully described my invention, what I claim, and desire to secure by Letters Patent, is—

The combination, substantially as described, of a telephone-transmitter, an inductorium, a receiver, and a charged main line, one coil of the inductorium and the receiver being in the main line and the other in one branch of said main line, the other branch of which includes the transmitter, substantially as set forth.

JACOB F. MEHREN.

Witnesses:
JOHN P. BARRETT,
DAVID M. HYLAND.